(12) United States Patent
Billock

(10) Patent No.: US 9,948,755 B1
(45) Date of Patent: Apr. 17, 2018

(54) METHODS AND SYSTEMS OF TRANSMITTING HEADER INFORMATION USING RATELESS CODES

(71) Applicant: Google Inc., Mountain View, CA (US)

(72) Inventor: Joseph Gregory Billock, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 35 days.

(21) Appl. No.: 15/207,931

(22) Filed: Jul. 12, 2016

Related U.S. Application Data

(63) Continuation of application No. 14/261,850, filed on Apr. 25, 2014, now abandoned.

(60) Provisional application No. 61/947,042, filed on Mar. 3, 2014.

(51) Int. Cl.
    *H04L 29/06*     (2006.01)
    *H04L 9/06*     (2006.01)

(52) U.S. Cl.
    CPC ............ *H04L 69/22* (2013.01); *H04L 9/0618* (2013.01)

(58) Field of Classification Search
    CPC ......... H04L 1/0041; G06T 9/00; G06T 9/005; H03M 13/1515
    See application file for complete search history.

(56) References Cited

U.S. PATENT DOCUMENTS

| | | | |
|---|---|---|---|
| 5,289,276 A | 2/1994 | Siracusa et al. | |
| 7,242,772 B1 | 7/2007 | Tehranchi | |
| 7,818,445 B2 | 10/2010 | Zuckerman et al. | |
| 7,869,597 B2 | 1/2011 | Nakai et al. | |
| 8,064,599 B2 | 11/2011 | Little | |
| 8,218,759 B2 | 7/2012 | Moffat et al. | |
| 8,542,824 B2 | 9/2013 | Brown et al. | |
| 8,751,819 B1 | 6/2014 | Langsworth | |
| 8,960,533 B2 | 2/2015 | Everett | |
| 9,288,011 B2 * | 3/2016 | Hwang | ................ H04L 1/0041 |
| 2005/0257106 A1 | 11/2005 | Luby et al. | |
| 2006/0087456 A1 | 4/2006 | Luby | |
| 2006/0107169 A1 | 5/2006 | Vedantham et al. | |
| 2006/0265601 A1 | 11/2006 | Zhu et al. | |
| 2008/0170691 A1 | 7/2008 | Chang et al. | |
| 2008/0317243 A1 | 12/2008 | Ramprashad | |
| 2012/0210128 A1 | 8/2012 | Hayashi et al. | |

* cited by examiner

*Primary Examiner* — Chandrahas B Patel

(74) *Attorney, Agent, or Firm* — Fox Rothschild LLP

(57) ABSTRACT

A method of communicating header information using rateless codes, may include identifying a message to be sent to a receiver, identifying header information associated with the message, disassembling the header information into a plurality of header blocks, identifying one or more first encoded block identifiers, performing a rateless encoding operation on a selected subset of the plurality of header blocks to generate an encoded header block, disassembling the message into a plurality of source blocks, identifying one or more second encoded block identifiers, performing the rateless encoding operation on a selected subset of the source blocks using the second encoded block identifier to generate an encoded source block, and transmitting one or more of the following to the receiver: (i) one or more of the first encoded block identifiers, (ii) the encoded header block, (iii) one or more of the second encoded block identifiers, or (iv) the encoded source block.

20 Claims, 5 Drawing Sheets

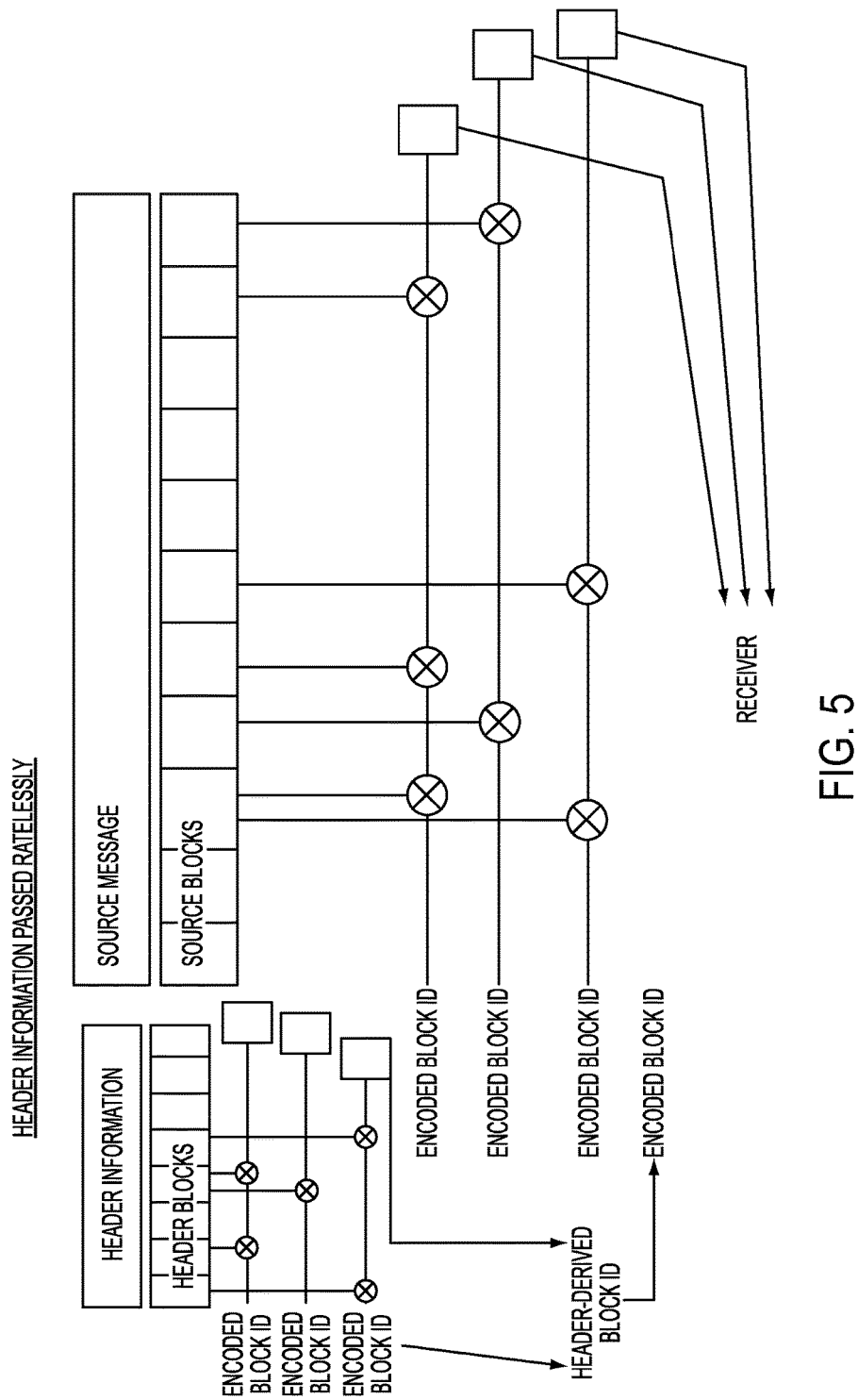

METHODS AND SYSTEMS OF TRANSMITTING HEADER INFORMATION USING RATELESS CODES

CROSS-REFERENCE TO RELATED APPLICATIONS

This application is a continuation of, and claims priority to, U.S. patent application Ser. No. 14/261,850 filed Apr. 25, 2014, which claims priority to U.S. Provisional Patent Application No. 61/947,042, filed on Mar. 3, 2014, the entireties of which are included herein by reference.

BACKGROUND

Rateless codes, otherwise known as fountain codes, can be used to transmit messages in a rateless way. Rateless transmissions do not need to exhibit a fixed code rate, and even if they do the rate may not be known to the receiver. Rather, rateless codes may include any number of bits or symbols per transmission. During rateless transmission, no acknowledgement from a receiver may be needed, since message fragments are sent in a way that provides a high probability that the receiver can reassemble the message when it has a sufficiently large subset of the fragments, even if some losses occur during transmission. The receiver simply receives the fragments and, when it has enough fragments to reconstruct the message, it does so.

Despite the non-fixed manner of rateless transmissions, certain header information must be known by both a sender and receiver in order to accurately reconstruct a message sent using a rateless code. Typically, this header information is transferred using conventional, synchronous communications. This document describes methods and systems that may address some or all the issues described above.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of communicating header information using rateless codes, may include, by a sender electronic device, identifying a message to be sent to a receiver, identifying header information associated with the message, disassembling the header information into a plurality of header blocks, identifying one or more first encoded block identifiers, performing a rateless encoding operation on a selected subset of the plurality of header blocks to generate an encoded header block, disassembling the message into a plurality of source blocks, and identifying one or more second encoded block identifiers. Each second encoded block identifier may include the corresponding first encoded block identifier and encoded header block. The method may include performing the rateless encoding operation on a selected subset of the source blocks using the second encoded block identifier to generate an encoded source block, and transmitting one or more of the following to the receiver: (i) one or more of the first encoded block identifiers, (ii) the encoded header block, (iii) one or more of the second encoded block identifiers, or (iv) the encoded source block.

In an embodiment, a method of communicating header information using rateless codes, may include, by a sender electronic device, identifying a message to be sent to a receiver, identifying header information associated with the message, disassembling the header information into a plurality of header blocks, identifying one or more encoded block identifiers, performing a rateless encoding operation on a selected subset of the plurality of header blocks to generate an encoded header block, disassembling the message into a plurality of source blocks; performing the rateless encoding operation on a selected subset of the source blocks using the one or more encoded block identifiers to generate an encoded source block, and transmitting one or more of the following to the receiver: (i) one or more of the encoded block identifiers, (ii) the encoded header block, or (iii) the encoded source block.

In an embodiment, a system of communicating header information using rateless codes may include a sender electronic device and a computer-readable storage medium in communication with the sender electronic device. The computer-readable storage medium may include one or more programming instructions that, when executed, cause the sender electronic device to identify a message to be sent to a receiver, identify header information associated with the message, disassemble the header information into a plurality of header blocks, identify one or more first encoded block identifiers, perform a rateless encoding operation on a selected subset of the plurality of header blocks to generate an encoded header block, disassemble the message into a plurality of source blocks, and identify one or more second encoded block identifiers. Each second encoded block identifier may include the corresponding first encoded block identifier and encoded header block. The computer-readable storage medium may include one or more programming instructions that, when executed, cause the sender electronic device to perform the rateless encoding operation on a selected subset of the source blocks using the second encoded block identifier to generate an encoded source block, and transmit one or more of the following to the receiver: (i) one or more of the first encoded block identifiers, (ii) the encoded header block, (iii) one or more of the second encoded block identifiers, or (iv) the encoded source block.

In an embodiment, a system of communicating header information using rateless codes may include a sender electronic device and a computer-readable storage medium in communication with the sender electronic device. The computer-readable storage medium may include one or more programming instructions that, when executed, cause the sender electronic device to identify a message to be sent to a receiver, identify header information associated with the message, disassemble the header information into a plurality of header blocks, identify one or more encoded block identifiers, perform a rateless encoding operation on a selected subset of the plurality of header blocks to generate an encoded header block, disassemble the message into a plurality of source blocks, perform the rateless encoding operation on a selected subset of the source blocks using the one or more encoded block identifiers to generate an encoded source block, and transmit one or more of the following to the receiver: (i) one or more of the encoded block identifiers, (ii) the encoded header block, or (iii) the encoded source block.

BRIEF DESCRIPTION OF THE DRAWINGS

FIG. 5 illustrates a graphical representation of a method of transmitting header information ratelessly as a component of the rateless transmission of a message according to an embodiment.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. When used in the claims, reference to "a computing device" may include a single device, or it may refer to any number of devices having one or more processors that communicate with each other and share data and/or instructions to perform the claimed steps.

A "header" refers to a segment of data that identifies at least a portion of message metadata that can be used for message identification and/or decoding. "Header information" refers to information contained in a header that is specific to a message. Example header information may include a total size of the message, a number of blocks in the message, the size of the message blocks and/or the like.

A "message" refers to a sequence of data that is to be transmitted from a sender electronic device to a receiver electronic device. For instance, in a cellular communication network, a message may include data that is identified and transmitted by a cellular tower electronic device to a mobile electronic device.

Figure 1:
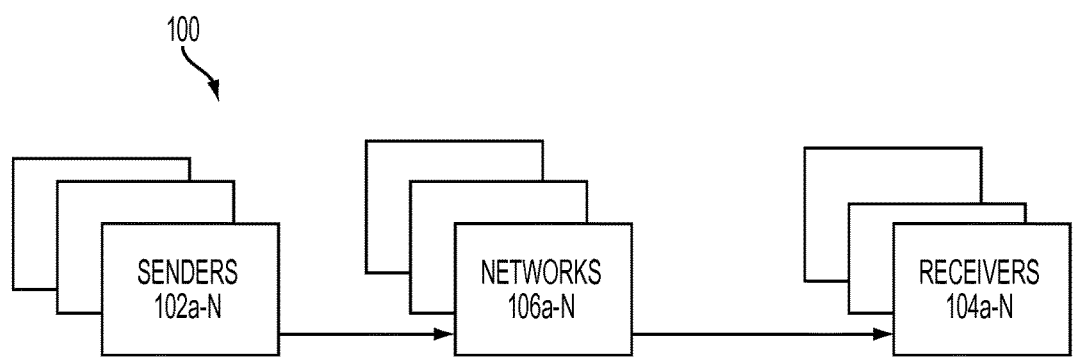
FIG. 1 illustrates an example system.

FIG. 1 illustrates an example system for communicating a message. As illustrated by FIG. 1, the system 100 may include one or more electronic devices that act as senders 102a-N, one or more electronic devices that serve as receivers 104a-N, and one or more communication networks 106a-N via which data passes between the senders and receivers. In an embodiment, a sender 102a-N may be an electronic device capable of sending one or more messages. A sender may be a computing device, a radio transmitter, a mobile electronic device, a cellular tower, and/or the like. Each receiver 104a-N may be an electronic device capable of receiving one or more messages from a sender. Example receivers 104a-N may include, without limitation, a computing device, a mobile device, a tablet and/or the like.

A sender 102a-N may communicate with a receiver 104 via one or more communication networks 106a-N. Each communication network 106a-N may be a local area network (LAN), a wide area network (WAN), a mobile or cellular communication network, an extranet, an intranet, the Internet and/or the like.

Figure 2:
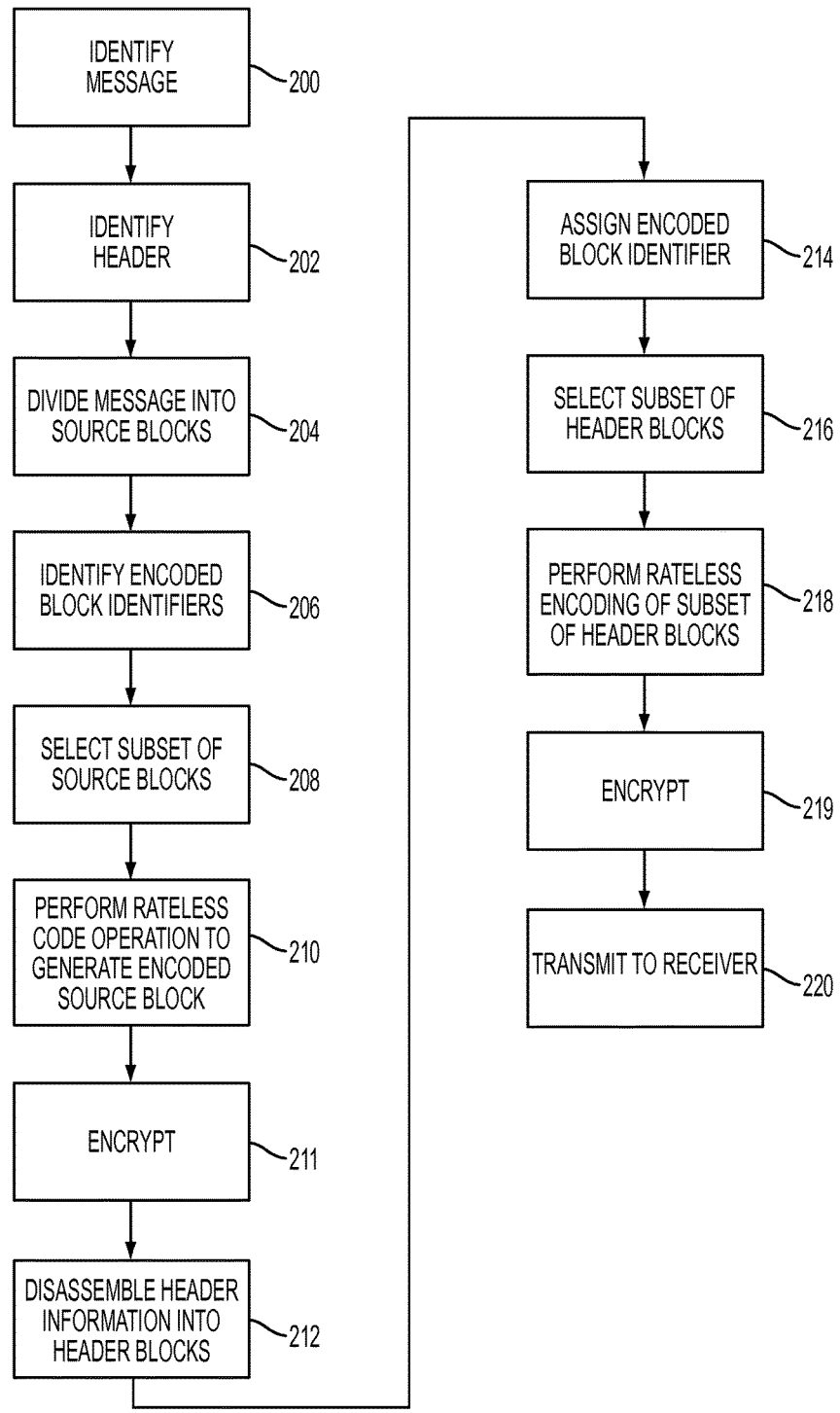
FIG. 2 is a flow chart illustrating a process of ratelessly transmitting header information in parallel to the rateless transmission of a message.

FIG. 2 illustrates a method of transmitting header information according to an embodiment. As illustrated by FIG. 2, a sender or a processor that is in communication with the sender may identify a message that is to be sent to a receiver 200. (For simplicity, in this context we may use the term "sender" to refer either to the actual sender or to the associated processor.) The message may include a header that contains information to help the receiver decode the message. Example header information may include, for example, the number of blocks of data in the message, the size of one or more blocks, the total message size, and/or the like. The sender may identify the header 202 as part of the message, or by generating the header in connection with generating the message itself.

In order to disseminate a message to one or more receivers, the sender may use a rateless encoder to divide 204 the message into one or more source blocks (i.e. message blocks containing content of the message) that are suitable for encoding. In an embodiment, the sender may identify 206 one or more encoded block identifiers. An encoded block identifier may be an integer that identifies each encoded source block of a message so that the receiver can know how to re-assemble the message from the encoded source blocks. The encoded block identifier may be randomly or pseudo-randomly generated by the sender. The encoded block identifier in this step may be one such as that referred to in prior art such as IETF RFC 5053 as an Encoding Symbol ID.

A subset of the source blocks may be selected 208 according to an embodiment. The source blocks may be selected 208 based at least in part on a corresponding encoded block identifier. A rateless encoding operation may be performed 210 on a selected subset of the plurality of header blocks to generate an encoded header block. For example, the content of the selected subset of source blocks may be combined to generate an encoded source block. For instance, the content of the selected subset of source blocks may be combined 210 using an exclusive OR (XOR) operation applied bitwise to the bits of each selected source block in the subset to generate an encoded block. According to various embodiments, different subsets may be selected 208 and a rateless encoding operation may be performed 210 to generate multiple encoded source blocks.

Optionally, before transmitting the encoded source blocks, the system may encrypt 211 one or more of the encoded source blocks. The system may derive an initialization vector using the encoded block identifier and a key shared with the receiver. The system may initialize a ciphersystem using the derived initialization vector, encrypt 211 the encoded source blocks using the initialized ciphersystem and transmit the encrypted encoded source blocks and encoded block identifier to the receiver.

In an embodiment, the sender also may disassemble 212 the header information into one or more header blocks that will be sent to the receiver. The header information may be considered as a second message that is to be sent to the receiver. For example, IETF RFC 5053 defines a rateless code having five values (total message length, alignment parameter, number of source symbols, number of sub-blocks and symbol size). These values require approximately 20 bytes, although the size may vary. The second message may include one or more header blocks made up of this header information. In an embodiment, the sender also may assign 214 one or more encoded block identifiers. For instance, the sender may assign 214 the same encoded block identifier that it identifies 206 and uses to construct an encoded message block.

The system may then select 216 a subset of the modified header blocks, or all of the modified header message blocks. In an embodiment, the header blocks may be selected 216 based at least in part on the corresponding encoded block identifier. If the system selects 216 a subset of the modified header message blocks, it may do so randomly or according to any suitable criteria that are agreed upon by the sender and receiver. A rateless encoding of the selected subset of the header blocks may be performed 218 according to the criteria in use to generate an encoded header block. For instance, the content of the header blocks in the selected subset may be combined to generate an encoded header block. As an example, the content of the header blocks in the selected subset may be combined using an XOR operation applied bitwise to the bits of each selected header block in the subset to generate an encoded header block according to an embodiment.

In an alternate embodiment, the system may ensure that each header block is of a size that fits within the encoded block identifier that is used to identify the encoded source blocks as illustrated by FIG. 5. For example, if the encoded block identifier for the encoded source blocks has a length of 64 bits, then the system may ensure that each header block has a size of 56 bits. If the header block does not evenly divide into such a size, it may select a padding strategy such that the full header will divide into header blocks such that each has a size of 56 bits. Additional and/or alternate lengths and sizes may be used within the scope of this disclosure. In an embodiment, the sender and receiver may agree on a certain size of each header block, so both the sender and the receiver are aware of the block size.

In an embodiment, an aggregation of the block identifier associated with the header and the corresponding encoded header block may be used as the encoded block identifier for the message to which the header corresponds. For instance, the encoded block identifier may be identified 206 according to, for example, the approach illustrated in FIG. 5 by identifying an aggregation of the block identifier associated with the message header and the corresponding encoded header block.

In an embodiment, the sender may transmit 220 one or more of the encoded block identifier associated with the encoded header blocks, the encoded header blocks, the encoded block identifier associated with the encoded source block and the encoded source blocks to the receiver via the network. The sender may transmit 220 the encoded header blocks substantially simultaneously with the encoded block identifiers and encoded message blocks.

Optionally, the system may encrypt or 219 one or more of the encoded header blocks before sending them as well. For example, the system may add the secret key used for the encryption to the header information and encrypt the header blocks using a public key that is associated with the receiver.

It is notable that in the embodiments described above, the tasks need not all be performed by a single sender. Message block processing and transmission activities may be divided between (or duplicated by) multiple senders, as the receiver can receive the blocks from any location.

Figure 3:
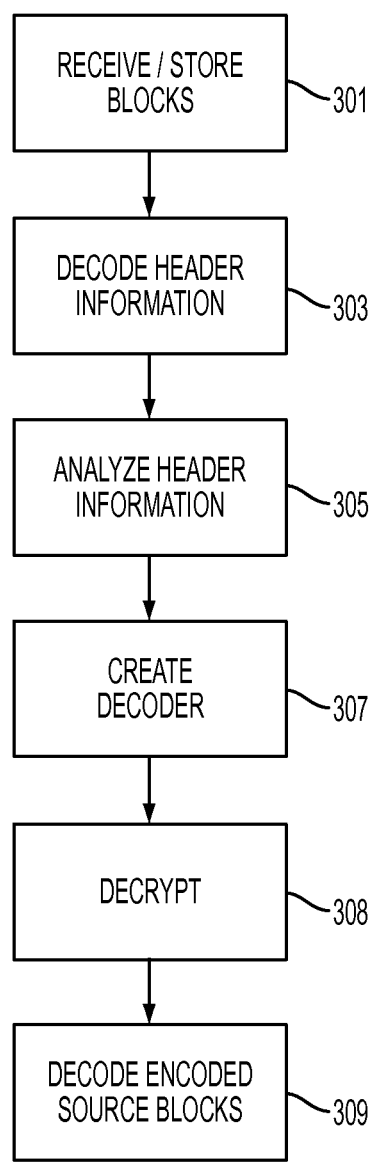
FIG. 3 is a flowchart illustrating a process of receiving and assembling a message that was received via multiple blocks.

FIG. 3 illustrates an example process that a receiver may implement when it receives the encoded source blocks and/or encoded header blocks as generated above. In particular, when the receiver receives the encoded source blocks and/or encoded header blocks, it may store them 301. Once the receiver has a sufficient number of the encoded header blocks to decode 303 the header information, it may analyze 305 the reconstructed header information and use it to create 307 the correct decoder. The receiver may then use the created decoder to decode 309 the encoded source blocks into the original message. For example, based on the number or size of the header message blocks received, the system may be able to identify the block identifier for the source blocks. Then, it may assemble each source block having the block identifier into the original message, using the other information in the message to help it identify when the original message is substantially complete, in what order to place the source blocks, and other assembly criteria.

For example, the reconstructed header information may include information needed to create a rateless code decoder. This information may include, without limitation, the total number of source blocks associated with the message, the message length and other pertinent information. The system may create the decoder using this information and re-process the received encoded source blocks using the encoded block identifiers as inputs given the decoding parameters ascertained from the header information.

In situations where the encoded source blocks have been encrypted and sent to a receiver, the receiver may decrypt 308 the received ratelessly encoded encrypted source blocks prior to decoding them. The receiver may use the key it shares with the sender and the received encoded block identifier to derive the initialization vector used by the sender. The receiver may then decrypt 308 the encrypted ratelessly encoded source blocks using the initialization vector. After the encrypted ratelessly encoded source blocks have been decrypted 308, the receiver may decode 309 the source blocks using its decoder.

In an alternate embodiment, if the secret key used for encryption is contained in the header blocks, then the receiver may, after reconstructing the header using the header block decoder, use the secret key contained therein to decrypt the encrypted source blocks.

Figure 4:
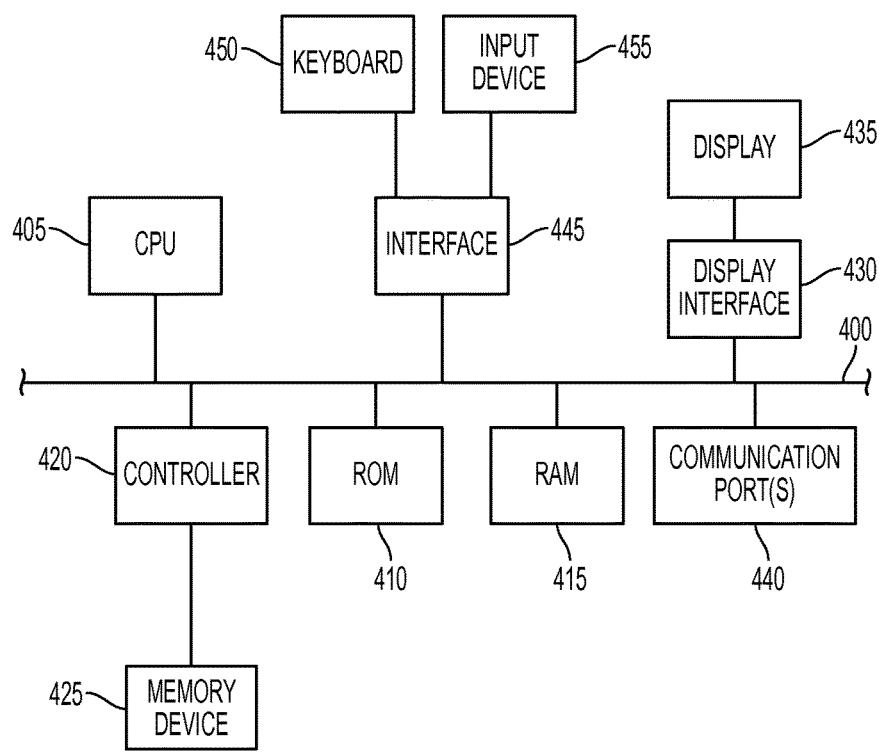
FIG. 4 illustrates a block diagram of example hardware that may be used to contain or implement program instructions according to an embodiment.

FIG. 4 depicts a block diagram of hardware that may be used to contain or implement program instructions. Hardware such as that described here may be included in a sender device and/or receiver device. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices. Program instructions, software or interactive modules for providing the interface and performing any of the claimed steps may be stored in the ROM 410, the RAM 415 and/or other computer-readable storage media 425.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

The invention claimed is:

1. A system of communicating header information using rateless codes, the system comprising:
   a sender electronic device; and
   a non-transitory computer-readable storage medium in communication with the sender electronic device, wherein the computer-readable storage medium comprises one or more programming instructions that, when executed, cause the sender electronic device to:
      identify a message to be sent to a receiver, wherein the message comprises message content,
      identify header information associated with the message, wherein the header identifies at least a portion of metadata for the message and comprises header information associated with the message,
      disassemble the header information into a plurality of header blocks such that each header block comprises at least a portion of the header information,
      identify one or more encoded block identifiers,
      perform a rateless encoding operation on a selected subset of the plurality of header blocks to generate an encoded header block,
      disassemble the message into a plurality of source blocks such that each source block comprises at least a portion of the message content,
      perform the rateless encoding operation on a selected subset of the source blocks using the one or more encoded block identifiers to generate an encoded source block, and
      transmit one or more of the following to the receiver:
         one or more of the encoded block identifiers,
         the encoded header block, or
         the encoded source block.

2. The system of claim 1, wherein the one or more programming instructions that, when executed, cause the sender electronic device to disassemble the header information into a plurality of header blocks comprise one or more programming instructions that, when executed, cause the sender electronic device to disassemble the header information into a plurality of header blocks such that each header block has a size that is known to both the sender and the receiver.

3. The system of claim 1, wherein the computer-readable storage medium further comprises one or more programming instructions that, when executed, cause the sender electronic device to:
   encrypt the encoded header block using a public key associated with the receiver; and
   add a secret key encoded using a public key to the header information, wherein the receiver has access to a private key corresponding to the public key.

4. The system of claim 1, wherein the computer-readable storage medium further comprises one or more programming instructions that, when executed, cause the sender electronic device to:
   encrypt the encoded source block by:
      deriving an initialization vector using the second encoded block identifier and a key that is shared between the sender and the receiver,
      initializing a ciphersystem using the initialization vector, and
      encrypting the encoded source block using the initialized ciphersystem; and
   transmit the encrypted encoded source block to the receiver.

5. A method of communicating header information using rateless codes, the method comprising, by a sender electronic device:
   identifying a message to be sent to a receiver, wherein the message comprises message content;
   identifying header information associated with the message, wherein the header identifies at least a portion of metadata for the message and comprises header information associated with the message;
   disassembling the header information into a plurality of header blocks such that each header block comprises at least a portion of the header information;
   identifying one or more encoded block identifiers;
   performing a rateless encoding operation on a selected subset of the plurality of header blocks to generate an encoded header block;
   disassembling the message into a plurality of source blocks such that each source block comprises at least a portion of the message content;
   performing the rateless encoding operation on a selected subset of the source blocks using the one or more encoded block identifiers to generate an encoded source block; and
   transmitting one or more of the following to the receiver:
      one or more of the encoded block identifiers,
      the encoded header block, or
      the encoded source block.

6. The method of claim 5, wherein disassembling the header information into a plurality of header blocks comprises disassembling the header information into a plurality of header blocks such that each header block has a size that is known to both the sender and the receiver.

7. The method of claim 5, further comprising:
   receiving, by the receiver, the encoded header block;
   reconstructing at least a portion of the header information from at least the encoded header block; and
   using the reconstructed header information to create a decoder.

8. The method of claim 7, wherein reconstructing at least a portion of the header information comprises:
   receiving one or more other encoded header blocks from the sender; and
   reconstructing at least a portion of the header information from the encoded header block and the other encoded header blocks.

9. The method of claim 7, further comprising:
   receiving, by the receiver, the encoded source block;
   using the decoder to decode the encoded source block.

10. The method of claim 7, further comprising:
receiving, by the receiver, the encoded source block and one or more other encoded source blocks;
using the decoder to decode the encoded source block and the one or more other encoded source blocks.

11. The method of claim 5, further comprising encrypting the encoded header block using a public key associated with the receiver.

12. The method of claim 11, further comprising adding a secret key encoded using a public key to the header information, wherein the receiver has access to a private key corresponding to the public key.

13. The method of claim 12, further comprising:
receiving, by the receiver, the encrypted encoded header block;
decrypting the encrypted encoded header block;
reconstructing at least a portion of the header information from at least the decrypted encoded header block;
obtaining, by the receiver, the secret key from the reconstructed header information; and
using the secret key by the receiver to decrypt one or more encrypted encoded source blocks.

14. The method of claim 5, further comprising:
encrypting the encoded source block; and
transmitting the encrypted encoded source block to the receiver.

15. The method of claim 14, wherein encrypting the encoded source block comprises:
deriving an initialization vector using the second encoded block identifier and a key that is shared between the sender and the receiver;
initializing a ciphersystem using the initialization vector; and
encrypting the encoded source block using the initialized ciphersystem.

16. The method of claim 15, further comprising:
receiving, by the receiver, the encrypted encoded source block;
decrypting the encrypted encoded source block; and
decoding the decrypted encoded source block.

17. The method of claim 16, wherein decrypting the encrypted encoded source block comprises:
using the key and one or more of the second encoded block identifiers to derive the initialization vector; and
decrypting the encrypted encoded source block using the derived initialization vector.

18. The method of claim 5, wherein each header block in the selected subset is of a size that fits within the one or more first encoded block identifiers.

19. The method of claim 5, wherein identifying one or more encoded block identifiers comprises pseudo-randomly identifying an integer value.

20. The method of claim 5, wherein performing a rateless encoding operation on a selected subset of the plurality of header blocks to generate an encoded header block comprises combining the header blocks in the selected subset to generate the encoded header block.

* * * * *